Jan. 5, 1937.  A. L. R. BERNARD  2,066,452
METHOD AND APPARATUS FOR LUBRICATING
Filed Oct. 20, 1932
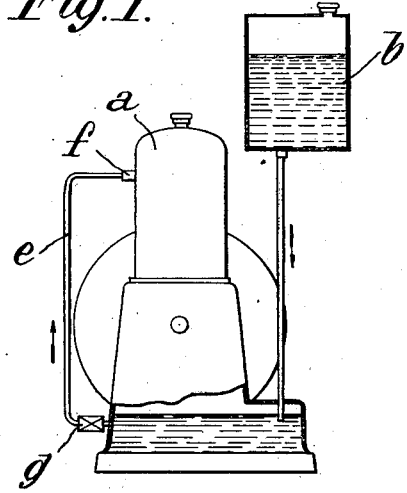
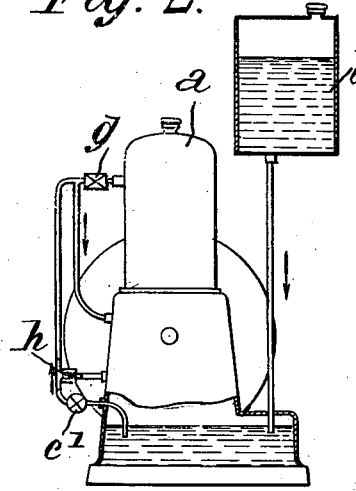
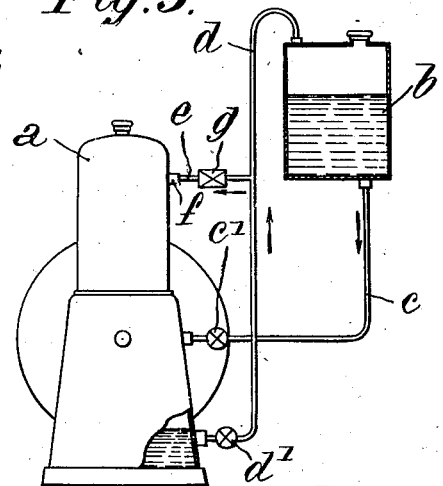
Inventor:
Auguste Louis René Bernard
Attorney:

Patented Jan. 5, 1937

2,066,452

UNITED STATES PATENT OFFICE 2,066,452

METHOD AND APPARATUS FOR LUBRICATING

Auguste Louis René Bernard, Rueil-Malmaison, France, assignor to Society "Fusion-Moteurs", Rueil-Malmaison, France, a society Application October 20, 1932, Serial No. 638,823
In Belgium October 21, 1931

11 Claims. (Cl. 123—196)

The present invention relates to internal combustion engines.

An object of the present invention is to provide an improved method of operating these engines so that lubrication is performed under better conditions.

My improved method consists in feeding said engine with a fuel capable of acting as a lubricant and in causing said fuel to work as a lubricating medium in the lubricating system of the engine before it is introduced into the combustion chamber of the engine.

Another object of my invention is to provide an internal combustion engine with a device for automatically causing the fuel to work as a lubricant in the lubricating system before it is introduced into the combustion chamber of the engine.

Further objects will appear in the course of the detailed description now to be given with reference to the accompanying drawing, in which:

Figure 1 is a diagrammatic view, partially in section, of one illustrative embodiment of the invention;

Figure 2 represents, in a manner similar to Figure 1, a first possible variant;

Figure 3 illustrates another possible variant.

The invention will be described with reference to an internal combustion engine of the type utilizing an injector but it is to be understood that it may be applied equally well to other types of internal combustion engines.

The method according to my invention consists essentially in utilizing a liquid which is capable of acting both as a fuel for the internal combustion engine and as a lubricant for the lubricating system of said engine and in causing said liquid to work as lubricant in said lubricating system before feeding it to the combustion chamber.

This method may be carried out, in actual practice, by (1) charging the fuel reservoir with an appropriate fuel, (2) charging the engine crank case with the liquid above referred to, which is both a lubricant and a fuel capable of being burnt in a combustion chamber, this liquid being of the nature of what is called in French engineering practice, "gas-oil" or some equivalent substance, (3) permitting the engine to operate until a new charge of fuel becomes necessary, (4) withdrawing a portion of the liquid from the crank case and charging it into the fuel reservoir and (5) replacing the liquid withdrawn by fresh liquid.

Proceeding in this way, the lubricant is frequently renewed or diluted and its content of impurities (or change in physical and chemical properties) is maintained below a maximum value depending upon the amount of fuel consumed by the motor and the rate at which the lubricant normally deteriorates or fouls.

Obviously, the above series of operations, if executed by hand, are not conveniently carried out and it is preferable to design the motor assembly so that they are executed automatically by the motor itself or by its accessories.

To this end, the motor or engine $a$ may be provided with a constant level system of lubrication (splash or pressure) such as is shown in Figures 1 and 2 and includes a reservoir $b$ positioned so as to feed fuel by gravity to the motor crank case through any appropriate means capable of maintaining the lubricant in said crankcase at a substantially constant level. If it be desired to utilize a pressure system of lubrication including a return line for lubricant to reservoir $b$ such as is shown in Figure 3, feed conduit $c$ and return conduit $d$ are provided with appropriate pumps $c^1$ and $d^1$ and are connected to reservoir $b$ in some such manner as is shown in the drawing.

As regards the supply of fuel to the engine, this is effected by either drawing the "lubricant-combustible" liquid from the crank case and injecting the latter into the combustion chamber, or if the "lubricant-combustible" liquid is not suitable by itself for combustion purposes, a lighter combustible may be added thereto prior to being injected or otherwise introduced into the combustion chamber of the engine. In the first instance the lubricant combustible liquid forms the sole source of power and in the latter instance it forms the principal source of power.

Either one of these fuel feeding procedures may be carried out in the following way:

If the lubricating system is of the constant level type (Figures 1 and 2), either the crank case (Fig. 1) is connected by means of a conduit $e$ with injector $f$ serving to feed combustible to the combustion chamber, an injecting pump $g$ being intercalated somewhere in said conduit, or (Figure 2) where the constant level system includes a lubricating pump $c^1$ acting to feed lubricant under pressure to the engine, injection pump $g$ is positioned along conduit $e$ at a point downstreamward with relation to a release valve $h$, valve $h$ being located downstreamward with relation to lubricating pump $c^1$.

If, on the contrary, the lubricating system including a closed circuit constituted of a reservoir $b$, feed conduit $c$, return conduit $d$, and pumps $c^1$ and $d^1$, be utilized, injector $f$ is connected by means of conduit $e$ to a point of said closed circuit, for instance to a point of conduit $d$. Whatever connection be chosen, injecting pump $g$ is intercalated in conduit line $e$.

As will be obvious to those skilled in the art, the volumes of the various reservoirs, the capacities of the pumps, the sections of the various conduits, etc., should be chosen so that the quantity of "lubricant-fuel" liquid may be sufficient to assure both lubrication and combustion.

Assuming these various desiderata to be fulfilled, the engine assembly will function as follows:

Assuming that the engine rotates at a constant speed, the liquid in the lubricating system fulfills its usual role and pump $g$ feeds liquid from said system to injector $f$ through which it is introduced into the combustion chamber.

If the liquid in the lubricating system were not thus aspirated, its content of impurities would increase constantly and its lubricating qualities would diminish because of the accumulation of such impurities as carbon, tar, water, dust, etc., while simultaneously the physical and chemical properties thereof would alter in a manner familiar to those skilled in the art. In other words, if the liquid in the lubricating system were utilized only for lubrication, its quality would progressively be impaired. But since, as pointed out above, liquid is constantly being withdrawn from said lubricating system to be used as fuel, and since furthermore fresh liquid is being fed to said lubricating system, a state of equilibrium is rapidly reached and the density of impurities in the liquid in the lubricating system remains substantially constant.

Calculations as well as tests show that when a constant level system such as shown in Figure 1 is utilized i. e., where the feed of fresh liquid to said lubricating system is continuous, the concentration of impurities (which is the preponderating factor in the alteration of the lubricant) tends, with time, to attain a fixed limit depending on various operating factors instead of increasing progressively, as has hitherto been the case.

When a system such as is shown in Figure 2 is used, the same phenomena are observed with the difference that the concentration of impurities, instead of maintaining itself at an absolutely constant value, varies between fixed limits, this being due to the fact that the feed of fresh liquid to the crank case is not continuous, but occurs at regular intervals. The concentration of impurities, in this case, varies in accordance with the period at which fresh liquid is being fed and has a mean value substantially equal to that observed in the case of the system shown in Figure 1 utilizing constant fuel replenishing.

If, as it is often the case in internal combustion engines, the air sucked into the combustion chamber is drawn from the crankcase, said air will be saturated with combustible vapors which will increase the efficiency of the motor or engine.

The invention is not to be taken as limited to the particular systems hereinabove described, thus: where a group of motors is being used, lubricant may be drawn from one motor to be injected as combustible into another, etc. The term "central lubricating system" as used in the claims is intended to mean a system in which a sufficient amount of lubricant is supplied for the working parts of the engine, and in which the same or a great part of the lubricant is repeatedly used for the working parts to be lubricated.

What I claim is:—

1. An internal combustion engine adapted to be fed with a fuel capable of acting as a lubricant and including a combustion chamber, means for injecting fuel into said chamber, and a crankcase adapted to contain lubricant, which comprises in combination, a fuel tank, a conduit connecting said tank with working parts of the engine, a conduit connecting said crankcase with said tank, means in said conduits for causing fuel to flow from said tank to said working parts through the first mentioned conduit and from said crankcase to said tank through said second mentioned conduit, thus forming a closed circuit, and means for forcing fuel from said circuit into said fuel injecting means.

2. The method of operating an internal combustion engine having a central lubricating system for the working parts of the engine and adapted to be fed with a lubricant which is also a fuel, which comprises feeding said lubricating system with said lubricant, withdrawing from said central lubricating system an amount of the lubricant, and feeding the lubricant thus withdrawn from said lubricating system to the engine and utilizing it as the principal source of motive power.

3. The method of operating an internal combustion engine having a central lubricating system for the working parts of the engine and adapted to be fed with a lubricant which is also a fuel, which comprises feeding said lubricating system with said lubricant, withdrawing from said central lubricating system an amount of the lubricant, feeding the lubricant thus withdrawn from said lubricating system to the engine and utilizing it as the principal source of motive power, and introducing fresh quantities of the lubricant into said lubricating system so as to replace the amount thus withdrawn.

4. An internal combustion engine including a combustion chamber and adapted to be fed with a lubricant which is also a fuel, which comprises in combination, a central lubricating system for the working parts of the engine, means for feeding said lubricant to said lubricating system, and means for feeding lubricant from said lubricating system into said combustion chamber for use as the principal source of power therefor.

5. An internal combustion engine adapted to be fed with a lubricant which is also a fuel and including a combustion chamber, means for injecting lubricant into said chamber, a fuel tank, and a central lubricating system for the working parts of the engine, means for conveying lubricant from said tank to said lubricating system, and means for feeding lubricant from said lubricating system to said injecting means for use in the engine as the principal source of power.

6. In combination with an internal combustion engine including a combustion chamber and a central lubricating system for the working parts of the engine and adapted to be fed with a lubricant which is also a fuel, means for causing a major part of said lubricant to lubricate said engine before being fed into said combustion chamber for use as the principal source of power.

7. An internal combustion engine including a combustion chamber and adapted to be fed with a lubricant which is also a fuel, which comprises in combination, a central lubricating system for the working parts of the engine, means for feeding said lubricant to said lubricating system, and means for injecting into said combustion chamber only lubricant fed from said lubricating system for use as the principal source of power.

8. An internal combustion engine adapted to be fed with a lubricant which is also a fuel and including a combustion chamber, means for injecting lubricant into said chamber, and a central lubricating system for the working parts of the engine, which comprises in combination, a lubricant tank, and means for conveying a substantial part of the lubricant from said tank to said injecting means through said lubricating system for use as the principal source of power.

9. An internal combustion engine adapted to be fed with a lubricant which is also a fuel and including a combustion chamber, means for injecting such lubricant into said chamber, and a crank case adapted to contain such lubricant, a lubricant tank, means for continuously feeding lubricant from said tank into said crank case so as to maintain the level of lubricant therein substantially constant and in an amount sufficient to lubricate the working parts of said crank case, and means for feeding lubricant from said crank case to said fuel injecting means for use as the principal source of power for the engine.

10. An internal combustion engine adapted to be fed with a lubricant which is also a fuel and including a combustion chamber, means for injecting such a lubricant into said chamber, and a crank case adapted to contain such lubricant, a lubricant tank, means for intermittently feeding lubricant from said tank into said crank case so as to maintain the level of lubricant therein substantially constant and in an amount sufficient to lubricate the working parts of said crank case, and means for feeding such lubricant from said crank case to said lubricant injecting means for use as the principal source of power for the engine.

11. An internal combustion engine adapted to be fed with a fuel capable of acting as a lubricant and including a combustion chamber, means for injecting fuel into said chamber, and a crank case adapted to contain lubricant, which comprises in combination, a fuel tank, a conduit connecting said tank with said crank case, a pump, a conduit connecting the intake of said pump with said crank case, means for connecting the discharge end of said pump to said fuel injecting means, and means, including a portion of said connecting means for forcing liquid from said crank case to working parts of the engine so as to lubricate them.

AUGUSTE LOUIS RENÉ BERNARD.